United States Patent
Wei et al.

(10) Patent No.: US 9,394,176 B2
(45) Date of Patent: Jul. 19, 2016

(54) METHOD FOR MAKING CARBON NANOTUBE FILM

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 85 days.

(21) Appl. No.: 14/521,242

(22) Filed: Oct. 22, 2014

(65) Prior Publication Data
US 2015/0360949 A1    Dec. 17, 2015

(30) Foreign Application Priority Data
Jun. 13, 2014    (CN) .......................... 2014 1 0262024

(51) Int. Cl.
| | |
|---|---|
| *B29C 35/16* | (2006.01) |
| *B29C 65/70* | (2006.01) |
| *B29C 71/02* | (2006.01) |
| *C01B 31/02* | (2006.01) |
| *B29C 65/00* | (2006.01) |

(52) U.S. Cl.
CPC ........... *C01B 31/0253* (2013.01); *B29C 65/002* (2013.01); *C01B 31/022* (2013.01)

(58) Field of Classification Search
CPC ...... B29C 35/16; B29C 65/002; B29C 65/70; B29C 71/02; C01B 31/02; C01B 31/022; C01B 31/0253
USPC ..................................... 264/28, 164; 156/230
See application file for complete search history.

(56) References Cited

U.S. PATENT DOCUMENTS

| | | | |
|---|---|---|---|
| 7,988,893 B2 | 8/2011 | Liao et al. | |
| 8,048,256 B2 | 11/2011 | Feng et al. | |
| 8,068,626 B2 | 11/2011 | Jiang et al. | |
| 8,101,953 B2 | 1/2012 | Jiang et al. | |
| 8,247,036 B2 | 8/2012 | Jiang et al. | |
| 8,248,377 B2 | 8/2012 | Jiang et al. | |
| 8,269,932 B2 | 9/2012 | Fu et al. | |
| 2010/0123267 A1 | 5/2010 | Jiang et al. | |
| 2010/0170891 A1 | 7/2010 | Feng et al. | |
| 2011/0171419 A1 | 7/2011 | Li et al. | |

*Primary Examiner* — Leo B Tentoni
(74) *Attorney, Agent, or Firm* — ScienBiziP, P.C.

(57) ABSTRACT

A method for forming a carbon nanotube film is disclosed. More than one carbon nanotube array is transferred onto a surface of more than one substitute substrate. The substitute substrates are arranged side by side to contact and combined side surfaces of the plurality of carbon nanotube arrays with each other by van der Waals attractive force to form an assembling array. The assembling array is larger than the carbon nanotube array. Carbon nanotube segments are drawn from the assembling array.

15 Claims, 11 Drawing Sheets

METHOD FOR MAKING CARBON NANOTUBE FILM

CROSS-REFERENCE TO RELATED APPLICATIONS

This application claims all benefits accruing under 35 U.S.C. §119 from China Patent Application No. 201410262024.4, filed on Jun. 13, 2014 in the China Intellectual Property Office, the contents of which are hereby incorporated by reference.

FIELD

The subject matter herein generally relates to methods for making carbon nanotube films, and especially relates to methods for making carbon nanotube films drawn from carbon nanotube arrays.

BACKGROUND

Carbon nanotube film can be fabricated by drawing from a carbon nanotube array grown on a growing substrate (e.g., silicon wafer), as disclosed by U.S. Pat. No. 8,048,256 to Feng et al. The carbon nanotube film is free standing and includes a plurality of carbon nanotubes joined end-to-end by van der Waals attractive force therebetween. The carbon nanotubes in the carbon nanotube film are substantially aligned along the lengthwise direction of the carbon nanotube film, and thus, the carbon nanotube film has good thermal and electrical conductivity along the direction of the aligned carbon nanotubes. The carbon nanotube film is substantially transparent and can be used as a conductive thin film. Therefore, the carbon nanotube film can be used in many different fields, such as touch panels, liquid crystal displays, speakers, heating devices, thin film transistors, cables, and the like.

BRIEF DESCRIPTION OF THE DRAWING

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other description that is described, such that the component need not be exactly conforming to the description. The term "comprising," when utilized, means "including, but not necessarily limited to"; it specifically indicates open-ended inclusion or membership in the so-described combination, group, series, and the like.

Figure 1:
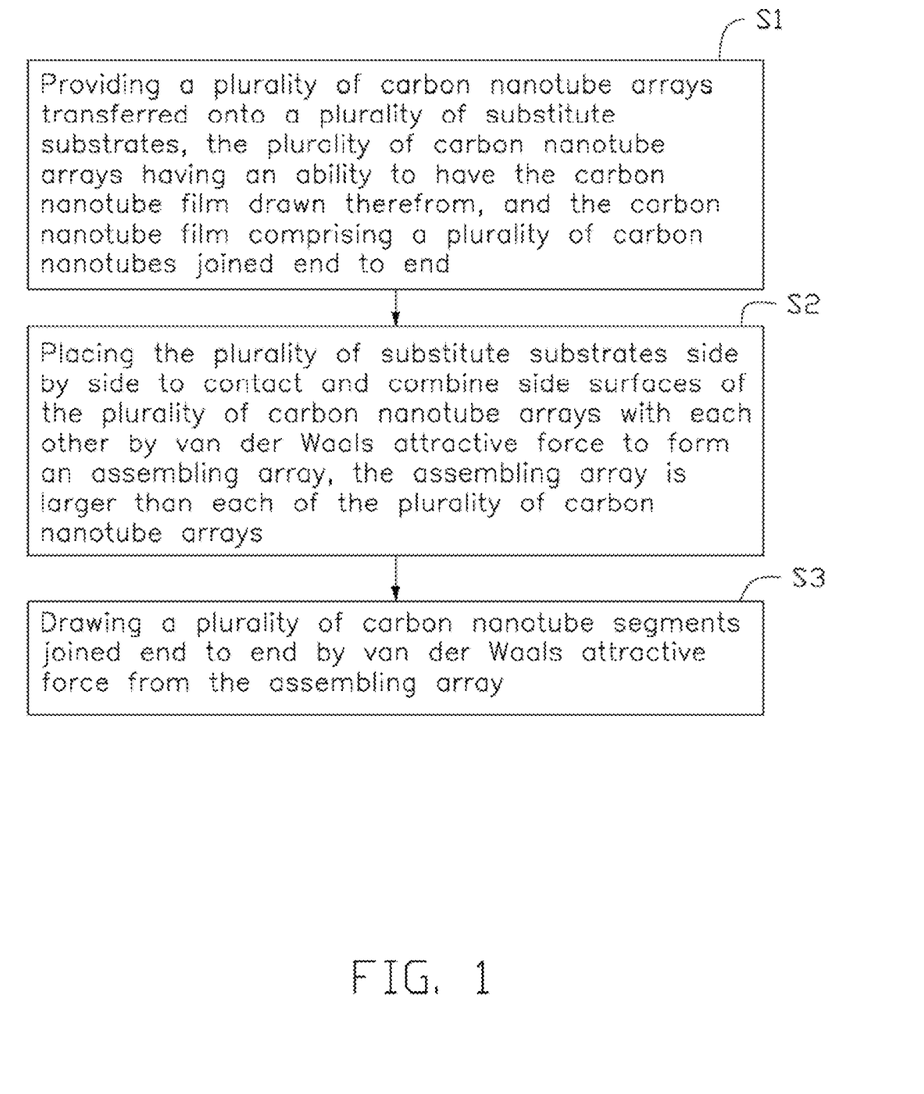
FIG. 1 is a flow chart of an embodiment of a method for a making carbon nanotube film.
Figure 2:
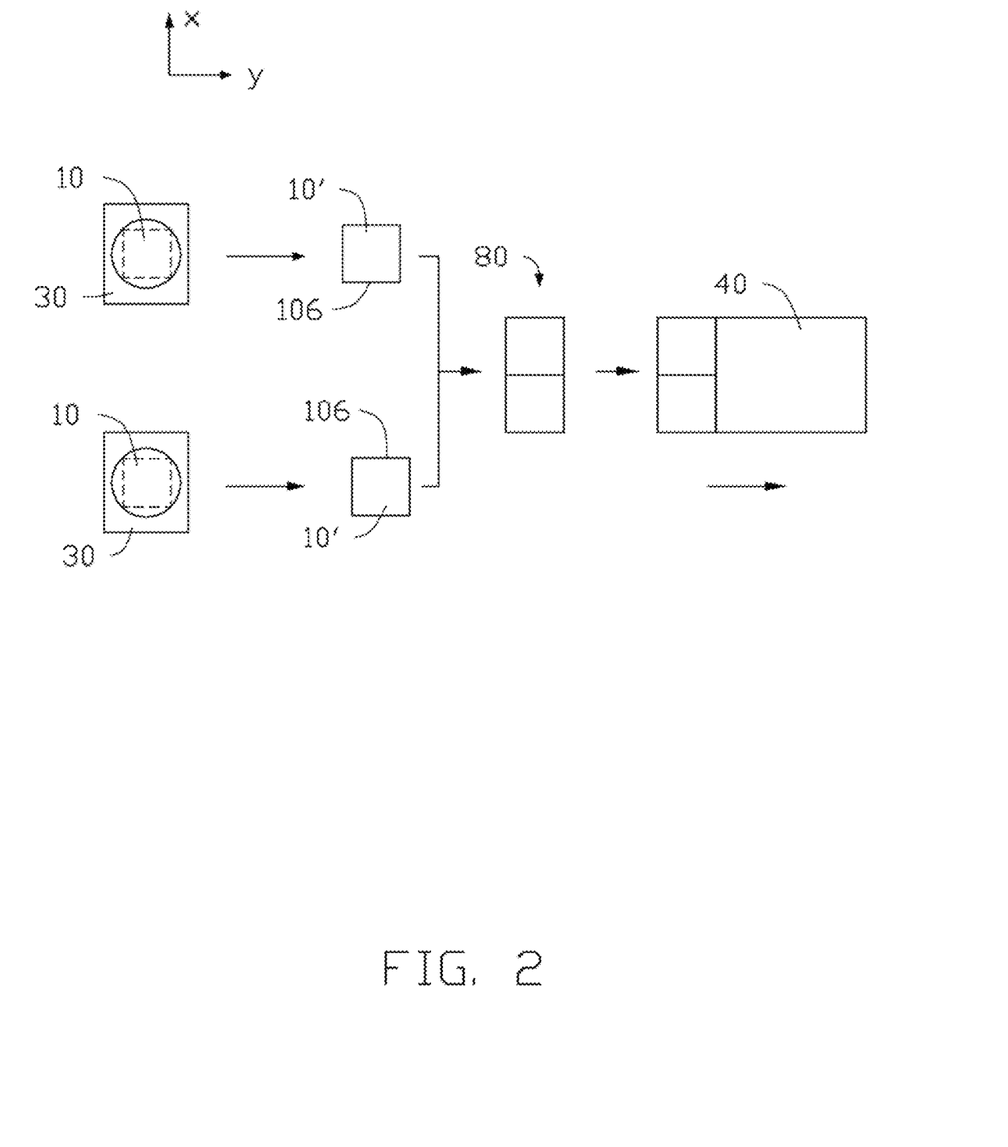
FIG. 2 is a schematic top view of an embodiment of the method for making the carbon nanotube film.

Referring to FIG. 1 and FIG. 2, the present disclosure is described in relation to a method for making a carbon nanotube film 40.

In block S1, a plurality of substitute substrates 30 and a plurality of carbon nanotube arrays 10 respectively transferred onto the plurality of substitute substrates 30 are provided. That is, there are a plurality of transferred structures, each of which comprises a substitute substrate 30 and a carbon nanotube array 10 transferred onto the substitute substrate 30. The carbon nanotube array 10 has an ability to have a carbon nanotube film 40 drawn therefrom. The carbon nanotube film 40 comprises a plurality of carbon nanotubes joined end to end.

In block S2, the plurality of substitute substrates 30 are placed side by side. Thereby, the plurality of carbon nanotube arrays 10 have side walls contacted and combined with each other by van der Waals attractive force to form an assembling array 80. The assembling array 80 is pieced by the plurality of carbon nanotube arrays 10 and thus has a size larger than each original carbon nanotube array 10.

In block S3, a carbon nanotube film 40 is drawn from the assembling array 80 and thus has a size larger than the carbon nanotube film that is drawn from a single carbon nanotube array 10.

The carbon nanotube film 40 can be a free-standing film comprising a plurality of carbon nanotubes joined end-to-end by van der Waals attractive force therebetween.

Transferring of Carbon Nanotube Array

Figure 3:
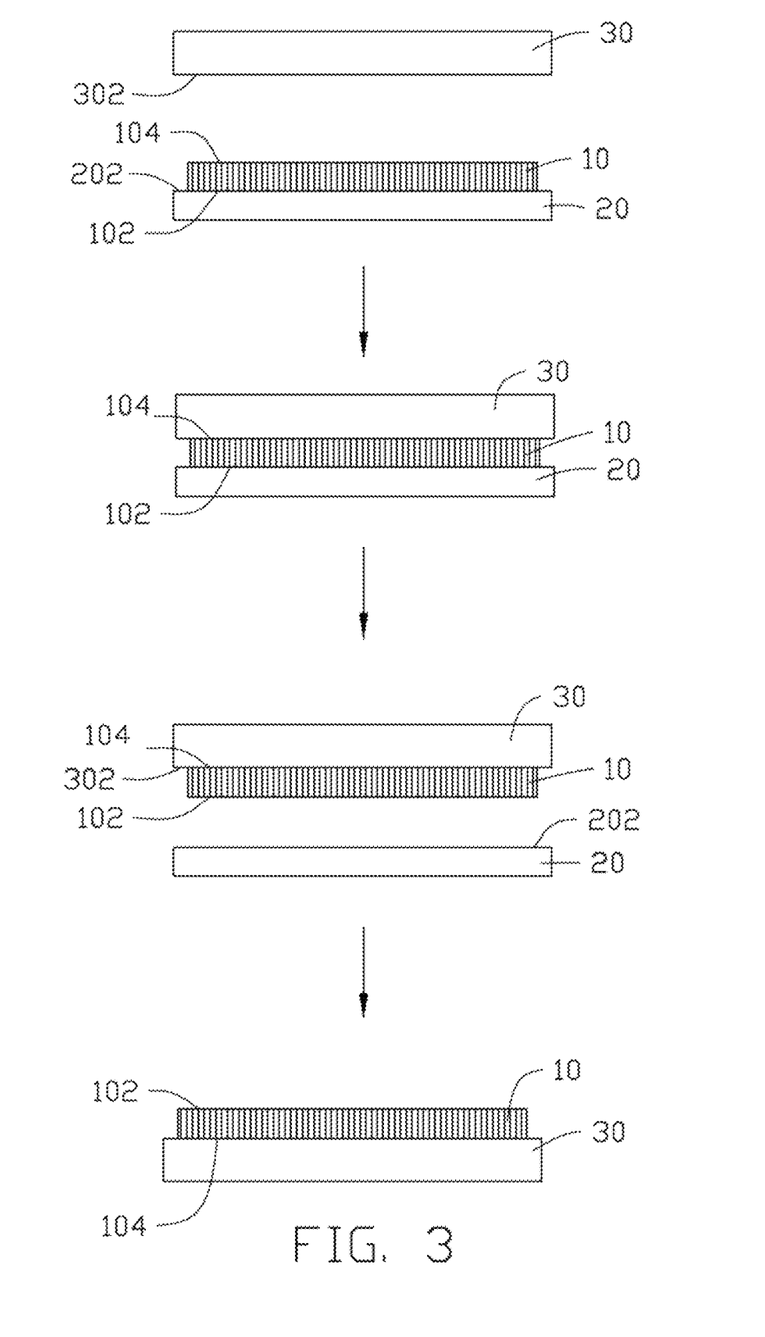
FIG. 3 is a schematic side view of an embodiment of a method for transferring a carbon nanotube array.

Referring to FIG. 3, in block S1, each of the plurality of carbon nanotube arrays 10 is originally grown/formed on an individual growing substrate 20 and is transferred to the individual substitute substrate 30.

First, a plurality of growing substrates 20, having individual carbon nanotube array 10 grown thereon, are provided. Each carbon nanotube array 10 has a bottom surface 102 and a top surface 104. The bottom surface 102 of the carbon nanotube array 10 is on the growing substrate 20. The top surface 104 of the carbon nanotube array 10 is away from the growing substrate 20. The carbon nanotube array 10 is grown to have a state/shape/form that is capable of having a carbon nanotube film 40 drawn therefrom. Individual carbon nanotube array 10 is transferred from the individual growing substrate 20 to the individual substitute substrate 30 and the state/shape/form of the carbon nanotube array 10, before, during, and after the transfer onto the substitute substrate 30, is still capable of having the carbon nanotube film 40 drawn therefrom.

The carbon nanotube array 10 is grown on the growing substrate 20 by a chemical vapor deposition (CVD) method. The carbon nanotube array 10 comprises a plurality of carbon nanotubes oriented substantially perpendicular to a growing surface of the growing substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube film 40, which can be in the shape of a film or a wire. The carbon nanotube array 10, that can have the carbon nanotube film 40 drawn therefrom, can be a super aligned carbon nanotube array. A material of the growing substrate 20 can be P-type silicon, N-type silicon, or other materials that are suitable for growing the super aligned carbon nanotube array.

The carbon nanotube film 40 drawn from the carbon nanotube array 10 comprises a plurality of carbon nanotubes joined end-to-end and can be a free-standing carbon nanotube film. The carbon nanotube film comprises a plurality of carbon nanotubes substantially aligned along the same direction.

Figure 4:
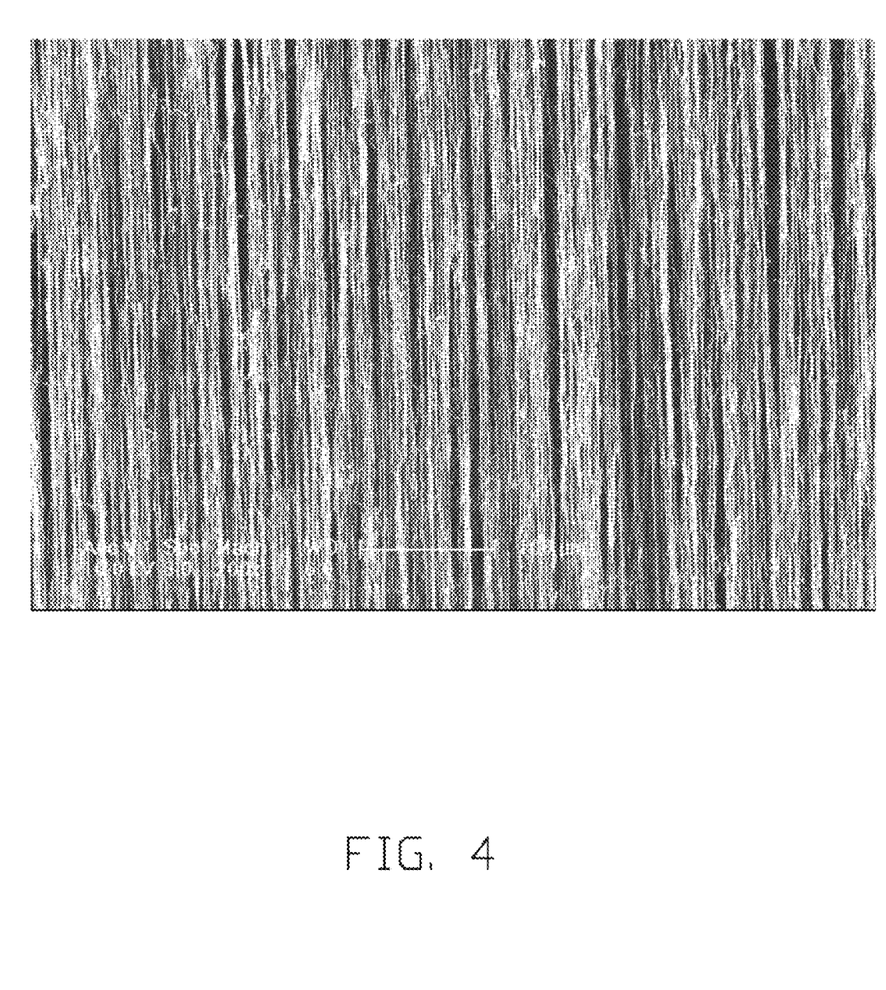
FIG. 4 shows a scanning electron microscope (SEM) image of a carbon nanotube film drawn from the carbon nanotube array.
Figure 5:
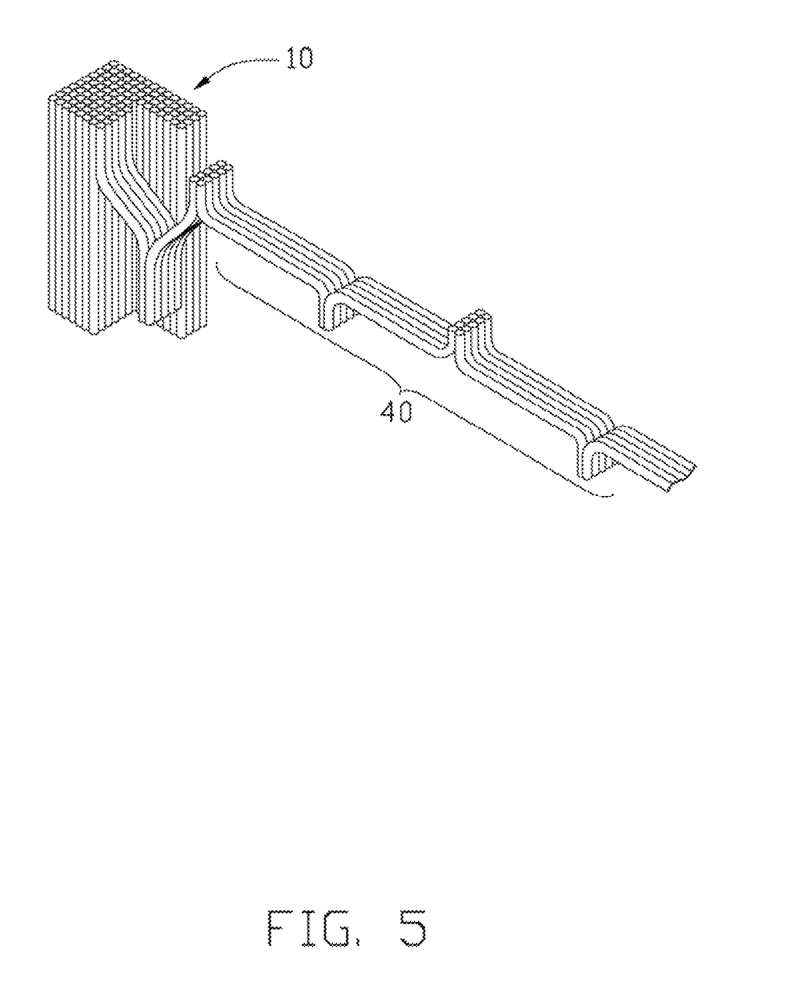
FIG. 5 shows a schematic structure view carbon nanotubes joined end-to-end.

Referring to FIG. 4 and FIG. 5, the carbon nanotube film 40 can comprise or consist of a plurality of carbon nanotubes. In the carbon nanotube film 40, the overall aligned direction of a majority of the carbon nanotubes is substantially aligned along the same direction parallel to a surface of the carbon nanotube film 40. A majority of the carbon nanotubes are substantially aligned along the same direction in the carbon nanotube film 40. Along the aligned direction of the majority of carbon nanotubes, each carbon nanotube is joined to adjacent carbon nanotubes end to end by van der Waals attractive force therebetween, whereby the carbon nanotube film 40 is capable of being free-standing structure. There may be a minority of carbon nanotubes in the carbon nanotube film 40 that are randomly aligned. However, the number of the randomly aligned carbon nanotubes is very small, in comparison, and does not affect the overall oriented alignment of the majority of carbon nanotubes in the carbon nanotube film 40. Some of the majority of the carbon nanotubes in the carbon nanotube film 40 that are substantially aligned along the same direction may not be exactly straight, and can be curved at a certain degree, or not exactly aligned along the overall aligned direction by a certain degree. Therefore, partial contacts can exist between the juxtaposed carbon nanotubes in the majority of the carbon nanotubes aligned along the same direction in the carbon nanotube film. The carbon nanotube film 40 can comprise a plurality of successive and oriented carbon nanotube segments. The plurality of carbon nanotube segments are joined end to end by van der Waals attractive force. Each carbon nanotube segment comprises a plurality of carbon nanotubes substantially parallel to each other, and the plurality of paralleled carbon nanotubes are in contact with each other and combined by van der Waals attractive force therebetween. The carbon nanotube segment has a desired length, thickness, uniformity, and shape. There can be clearances between adjacent and juxtaposed carbon nanotubes in the carbon nanotube film 40. A thickness of the carbon nanotube film at the thickest location is about 0.5 nanometers to about 100 microns (e.g., in a range from 0.5 nanometers to about 10 microns).

The term "free-standing" comprises, but is not limited to, a structure that does not need to be supported by a substrate. For example, a free-standing carbon nanotube film 40 can sustain the weight of itself when it is hoisted by a portion thereof without any significant damage to its structural integrity. If the free-standing carbon nanotube film 40 is placed between two separate supporters, a portion of the free-standing carbon nanotube film 40 suspended between the two supporters can maintain structural integrity. The free-standing carbon nanotube film 40 can be realized by the successive carbon nanotubes joined end to end by van der Waals attractive force.

In the present disclosure, the growing of the carbon nanotube arrays 10 and the drawing of the carbon nanotube film 40 are processed on different structures (i.e., the growing substrates 20 and the substitute substrates 30). The substitute substrates 30 for drawing the carbon nanotube film 40 can be made of low-price materials, and the growing substrates 20 can be recycled quickly. Thus, production of the carbon nanotube film 40 can be optimized.

The material of the substitute substrates 30 can be at least one of soft, elastic, and rigid solid substrate, such as metal, glass, crystal, ceramic, silicon, silicon dioxide, plastic, and resin, such as polymethyl methacrylate and polyethylene terephthalate.

Each substitute substrate 30 has a surface 302 to accept the carbon nanotube array 10 thereon. The surface 302 of the substitute substrate 30 can be flat when the carbon nanotube array 10 is grown on a flat growing surface 202 of the growing substrate 20. During transferring of the carbon nanotube array 10 from the growing substrate 20 to the substitute substrate 30, the state of the carbon nanotube array 10 is still capable of drawing the carbon nanotube film 40 from the carbon nanotube array 10 on the substitute substrate 30. The carbon nanotube array 10 transferred to the substitute substrate 30 is still a super aligned carbon nanotube array. The carbon nanotubes of the carbon nanotube array 10 are substantially perpendicular to the surface of the substitute substrate 30.

The carbon nanotube array 10 is arranged upside down on the surface 302 of the substitute substrate 30. The carbon nanotubes are grown from the growing surface 202 of the growing substrate 20 to form the carbon nanotube array 10. The carbon nanotube comprises a bottom end adjacent or contacting the growing substrate 20 and a top end away from the growing substrate 20. The bottom ends of the carbon nanotubes form the bottom surface 102 of the carbon nanotube array 10, and the top ends of the carbon nanotubes form the top surface 104 of the carbon nanotube array 10. After the carbon nanotube array 10 is transferred to the substitute substrate 30, the top surface 104 of the carbon nanotube array 10 is now adjacent to or contacting the substitute substrate 30, and the bottom surface 102 of the carbon nanotube array 10 is now away from the substitute substrate 30.

In one embodiment, each carbon nanotube array 10 is transferred by:
contacting the surface 302 of the substitute substrate 30 to the top surface 104 of the carbon nanotube array 10; and
separating the substitute substrate 30 from the growing substrate 20, thereby separating the bottom surface 102 of the carbon nanotube array 10 from the growing substrate 20 to transfer the carbon nanotube array 10 from the growing substrate 20 to the substitute substrate 30.

The carbon nanotube array 10 can be transferred from the growing substrate 20 to the substitute substrate 30 at room temperature (e.g., 10° C. to 40° C.).

The surface 302 of the substitute substrate 30 and the top surface 104 of the carbon nanotube array 10 can be bonded only by van der Waals attractive forces, and a bonding force ($F_{BC}$) between the carbon nanotube array 10 and the substitute substrate 30 is smaller than the van der Waals attractive forces ($F_{CC}$) between the carbon nanotubes in the carbon nanotube array 10. Meanwhile, the bonding force $F_{BC}$ is larger than the bonding force ($F_{AC}$) between the carbon nanotube array 10 and the growing substrate 20, to separate the carbon nanotube array 10 from the growing substrate 20. Therefore, $F_{AC} < F_{BC} < F_{CC}$ must be satisfied.

To satisfy $F_{AC} < F_{BC} < F_{CC}$, the substitute substrate 30 can have a suitable surface energy and a suitable interface energy can exist between the substitute substrate 30 and the carbon nanotube array 10. Thus, the substitute substrate 30 can generate enough bonding force (e.g., van der Waals attractive force) with the carbon nanotube array 10 simply by contacting the carbon nanotube array 10. A suitable material of the substitute substrate 30 must have a sufficient bonding force $F_{BC}$ (e.g., van der Waals attractive force) with the top surface 104 of the carbon nanotube array 10 to overcome the bonding force $F_{AC}$ between the carbon nanotube array 10 from the growing substrate 20. The surface 302 of the substitute substrate 30 can be substantially flat. In one embodiment, the material of the substitute substrate 30 is poly(dimethylsiloxane) (PDMS).

The substitute substrate 30 can adhere to the carbon nanotube array 10 without another substance (e.g., an adhesive binder) and only by van der Waals attractive forces. Although the adhesive binder can have a bonding force with the carbon nanotube array 10 greater than the bonding force between the carbon nanotube array 10 and the growing substrate 20, because the van der Waals attractive force between the carbon nanotubes in the carbon nanotube array 10 is small, the bonding force provided by the adhesive binder may be too great (i.e., greater than the bonding force $F_{CC}$ between the carbon nanotubes in the carbon nanotube array 10). In this situation, the carbon nanotube film 40 cannot be drawn from the transferred carbon nanotube array 10. During the transferring, the substitute substrate 30 can always be in a solid state.

Figure 6:
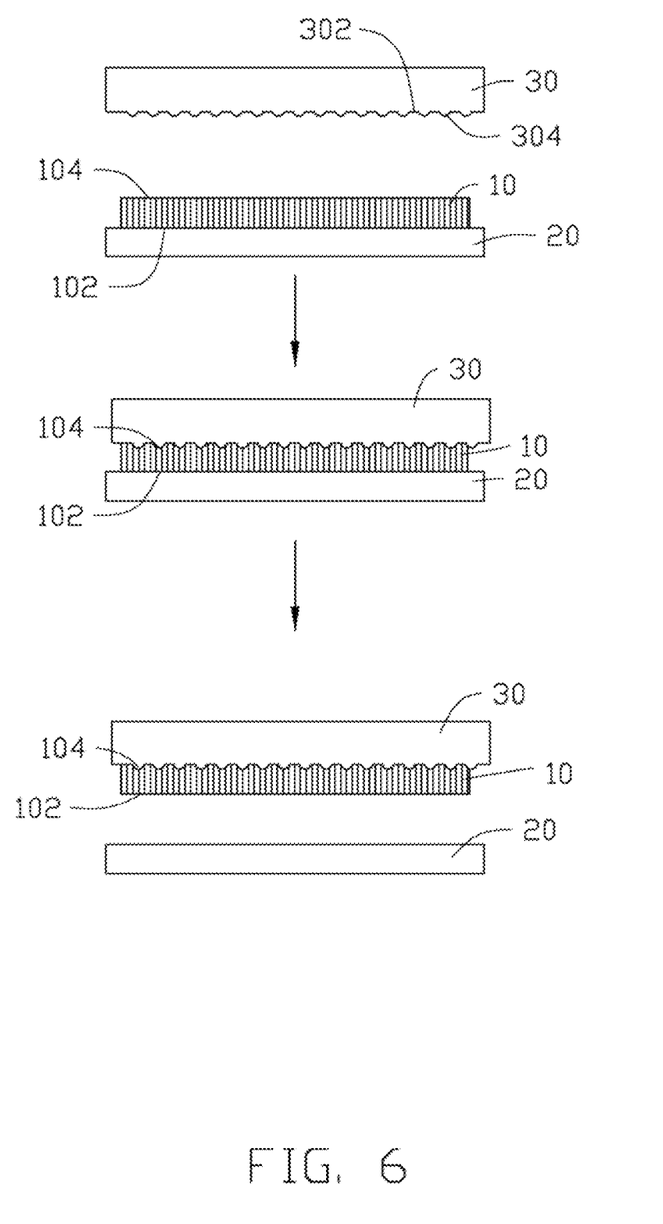
FIG. 6 is a schematic side view of another embodiment of the method for transferring the carbon nanotube array.

Referring to FIG. 6, in one embodiment, to satisfy $F_{AC} < F_{BC} < F_{CC}$, the substitute substrate 30 can increase the surface area of the surface 302 by using the microstructures 304, thus increasing the $F_{BC}$. The substitute substrate 30 can have the surface 302 with a plurality of microstructures 304 located thereon. The microstructure 304 can have a point shape and/or a long and narrow shape, and can be protrusions and/or recesses. The cross section of the microstructures 304 can be semicircular, rectangular, conical, and/or stepped. The microstructures 304 can be hemi-spheres, convex or concave columns, pyramids, pyramids without tips, and any combination thereof. In one embodiment, the microstructures 304 can be parallel and spaced grooves. In another embodiment, the microstructures 304 can be uniformly spaced hemispherical protrusions. The plurality of microstructures 304 are uniformly distributed on the surface 302 of the substitute substrate 30. The size of the a single microstructure 304 can be in a range from about 50 nanometers to about 500 microns. The microstructures 304 can be spaced from each other for a distance greater than 50 nanometers. In one embodiment, the surface 302 having the microstructures 304 located thereon has a surface area of 30% to 120% more than a smooth surface of equivalent area. The surface 302 sufficiently contacts the top surface 104 of the carbon nanotube array 10. Thus, the material of the substitute substrate 30 is not limited to PDMS and can be other conventional substrate materials such as soft, elastic, and rigid solid materials.

The height of the protrusion and the depth of the recess of the microstructures 304 can be 0.5% to 10% of the height of the carbon nanotube array 10. In one embodiment, the height of the protrusion and the depth of the recess can be in a range from about 5 microns to about 50 microns. The surface 302 needs an overall flatness to sufficiently contact the top surface 104 of the carbon nanotube array 10. The microstructures 304 can be formed on the surface 302 by laser etching, chemical etching, or lithography.

The microstructures 304 make the surface 302 of the substitute substrate 30 relatively rough. When the recessed portion of the surface 302 is in contact with the top surface 104 of the carbon nanotube array 10, the protruded portion of the surface 302 may slightly curve the carbon nanotubes contacting the protruded portion. However, the microstructures 304 are small, so the curve is small, and when the substitute substrate 30 and the growing substrate 20 are separated, the carbon nanotubes can elastically restore to a substantially straight shape and the carbon nanotube array 10 can restore to its original height. Thus, the state of the carbon nanotube array 10 is still capable of having the carbon nanotube film 40 drawn from the carbon nanotube array 10.

To ensure almost all the top ends of the carbon nanotubes in the carbon nanotube array 10 have sufficient contact with the surface of the substitute substrate 30, the substitute substrate 30 and the growing substrate 20 can be brought close enough to each other. A distance from the surface 302 of the substitute substrate 30 to the surface 202 of the growing substrate 20 can be less than or equal to the height of the carbon nanotube array 10 to apply a pressing force (f) to the carbon nanotube array 10. The pressing force f cannot be too large to ensure the state of the carbon nanotube array 10 is still capable of drawing the carbon nanotube film 40 when transferred to the substitute substrate 30. The pressing force is not to press the carbon nanotubes down or vary the length direction of the carbon nanotubes in the carbon nanotube array 10, otherwise the state of the carbon nanotube array 10 could change. Thus, the distance between the surface 302 of the substitute substrate 30 and the surface 202 of the growing substrate 20 cannot be too small and should be larger than an extreme value. The extreme value is a value that causes the state of the carbon nanotube array 10 to be unable to draw the carbon nanotube film 40.

Figure 7:
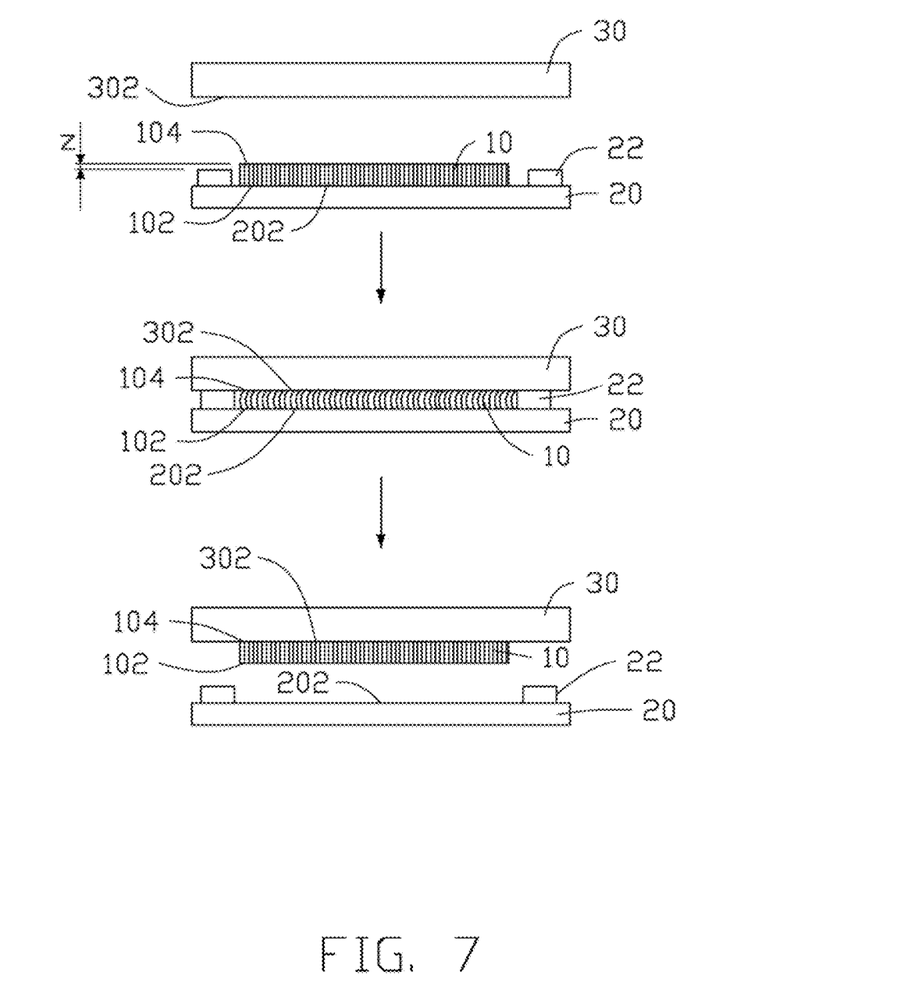
FIG. 7 is a schematic side view of yet another embodiment of the method for transferring the carbon nanotube array.

However, the pressing force is difficult to control, and the height of the carbon nanotube array 10 is often in tens of microns to hundreds of microns. If the pressing force is too large, the carbon nanotubes in the array 10 may be pressed down. Referring to FIG. 7, in one embodiment, a spacing element 22 is provided. The substitute substrate 30 is spaced from the growing substrate 20 by the spacing element 22. The spacing element 22 is used to limit the distance between the surface 302 of the substitute substrate 30 and the surface 202 of the growing substrate 20. The height of the spacing element 22 located between the substitute substrate 30 and the growing substrate 20 is smaller than or equal to the height of the carbon nanotube array 10 and larger than the extreme value. A height distance (z) between the spacing element 22 and the carbon nanotube array 10 can exist. The spacing element 22 is a solid member. In one embodiment, the spacing element 22 is rigid. By controlling the height of the spacing element 22, the distance between the substitute substrate 30 and the growing substrate 20 can be precisely controlled. The height (m) of the spacing element 22 can be 0.9 times to 1 time of the height (n) of the carbon nanotube array 10 (i.e., m=0.9n to n).

During the pressing of the carbon nanotube array 10, the carbon nanotubes in the carbon nanotube array 10 are still substantially perpendicular to the growing surface of the growing substrate 20. When the height (m) is smaller than the height (n), the carbon nanotubes in the carbon nanotube array 10 can be pressed to be curved slightly. However, the curve is small and when the substitute substrate 30 and the growing substrate 20 are separated, the carbon nanotubes can restore the straight shape and the carbon nanotube array 10 can restore the original height. Thus, the state of the carbon nanotube array 10 is still kept to be capable of having the carbon nanotube film 40 drawn from the carbon nanotube array 10.

In one embodiment, the spacing element 22 is arranged on the growing substrate 20. In another embodiment, the spacing element 22 is arranged on the substitute substrate 30. In yet another embodiment, the spacing element 22 can be a part of the growing substrate 20 or the substitute substrate 30. A shape of the spacing element 22 is not limited and can be a block, a piece, a column, or a ball. There can be a plurality of spacing elements 22 uniformly arranged around the carbon nanotube array 10. The spacing element 22 can be a round circle around the carbon nanotube array 10. In another embodiment, the spacing elements 22 are a plurality of round columns uniformly arranged around the carbon nanotube array 10. The spacing element 22 can be used with or without the microstructures 304.

During the separating of the substitute substrate 30 away from the growing substrate 20, a majority of the carbon nanotubes in the carbon nanotube array 10 can be detached from the growing substrate 20 at the same time by moving either the substitute substrate 30, the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. The two substrates both moves along the direction perpendicular to the growing surface of the growing substrate 20 and depart from each other.

Figure 8:
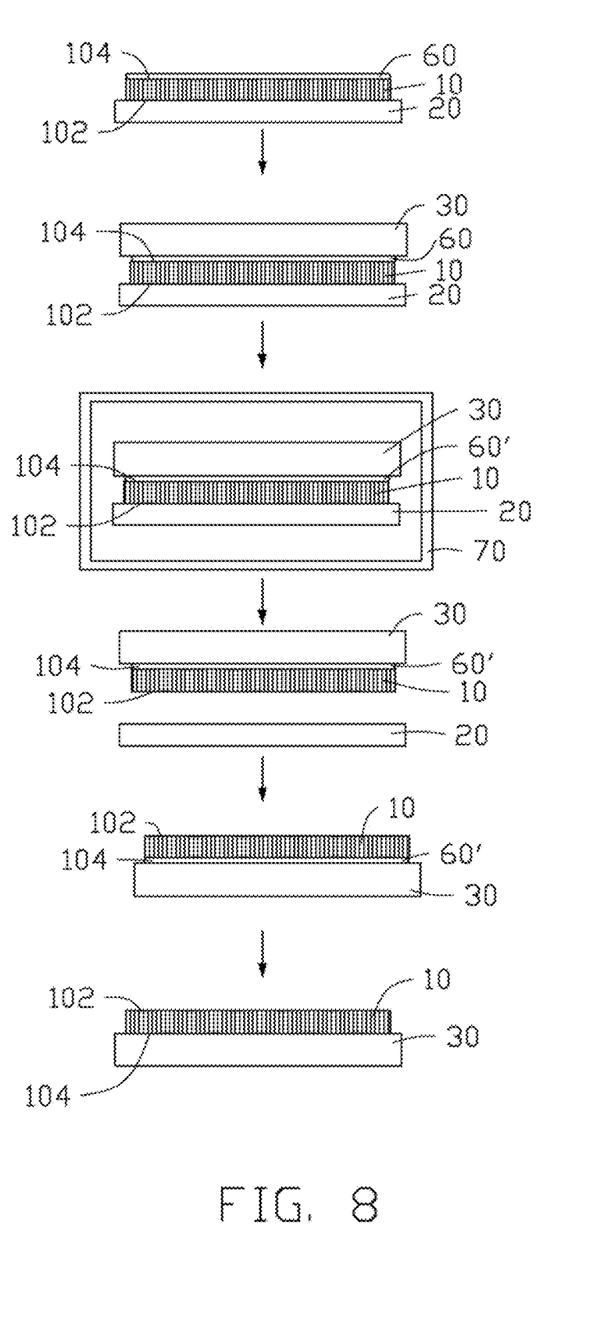
FIG. 8 is a schematic side view of yet another embodiment of the method for transferring the carbon nanotube array.

Referring to FIG. 8, in another embodiment, each carbon nanotube array 10 is transferred by:
  placing the substitute substrate 30 on the top surface 104 of the carbon nanotube array 10 and sandwiching liquid medium 60 between the substitute substrate 30 and the carbon nanotube array 10;
  solidifying the liquid medium 60 between the substitute substrate 30 and the carbon nanotube array 10 into solid medium 60';
  separating the substitute substrate 30 from the growing substrate 20, thereby separating the bottom surface 102 of the carbon nanotube array 10 from the growing substrate 20; and
  removing the solid medium 60' between the substitute substrate 30 and the carbon nanotube array 10.

The liquid medium 60 can be in a shape of fine droplets, mist, or film. The liquid medium 60 can be spread on the entire top surface 104. The liquid medium 60 can be water and/or organic solvents with small molecular weights that are volatile at room temperature or easily evaporated by heating. The organic solvent can be selected from ethanol, methanol, and acetone. The liquid medium 60 has a poor wettability for carbon nanotubes. Thus, when a small amount of the liquid medium 60 is on the top surface 104 of the carbon nanotube array 10, it cannot infiltrate inside the carbon nanotube array 10 and will not affect the state of the carbon nanotube array 10. A diameter of the liquid droplet and a thickness of the liquid film can be in a range from about 10 nanometers to about 300 microns. The substitute substrate 30 and the top surface 104 of the carbon nanotube array 10 are both in contact with the liquid medium 60.

During the placing the substitute substrate 30 on the top surface 104, the substitute substrate 30 may apply a pressing force as small as possible to the carbon nanotube array 10. The pressing force can satisfy $0<f<2N/cm^2$. The pressing force does not press the carbon nanotubes down or vary the length direction of the carbon nanotubes in the carbon nanotube array 10. The carbon nanotubes in the carbon nanotube array 10 between the substitute substrate 30 and the growing substrate 20 are always substantially perpendicular to the growing surface of the growing substrate 20.

In one embodiment, the liquid medium 60 is formed on the top surface 104 of the carbon nanotube array 10. The liquid medium 60 can be formed into fine droplets or a mist in the air and drop or collect onto the top surface 104 of the carbon nanotube array 10. The substitute substrate 30 and the carbon nanotube array 10 on the growing substrate 20 are brought together such that the surface of the substitute substrate 30 and the liquid medium 60 on the top surface 104 are contacting each other.

In another embodiment, the liquid medium 60 is formed on the surface of the substitute substrate 30. The liquid medium 60 can be formed into fine droplets or a mist in the air and drop or collect onto the surface of the substitute substrate 30. The substitute substrate 30 and the carbon nanotube array 10 on the growing substrate 20 are brought together such that the top surface 104 of the carbon nanotube array 10 and the liquid medium 60 on the surface of the substitute substrate 30 are contacting each other.

During the solidifying of the liquid medium 60, the temperature of the liquid medium 60 can be decreased to below the freezing point of the liquid medium 60. After the liquid medium 60 is solidified, the substitute substrate 30 and the carbon nanotube array 10 can be firmly bonded together by the solid medium 60' therebetween. In one embodiment, water is frozen into ice below 0° C.

In one embodiment, the laminate of the growing substrate 20, the carbon nanotube array 10, the liquid medium 60, and the substitute substrate 30 can be put into a freezer 70 with a temperature below the freezing point to freeze the liquid medium 60.

Figure 9:
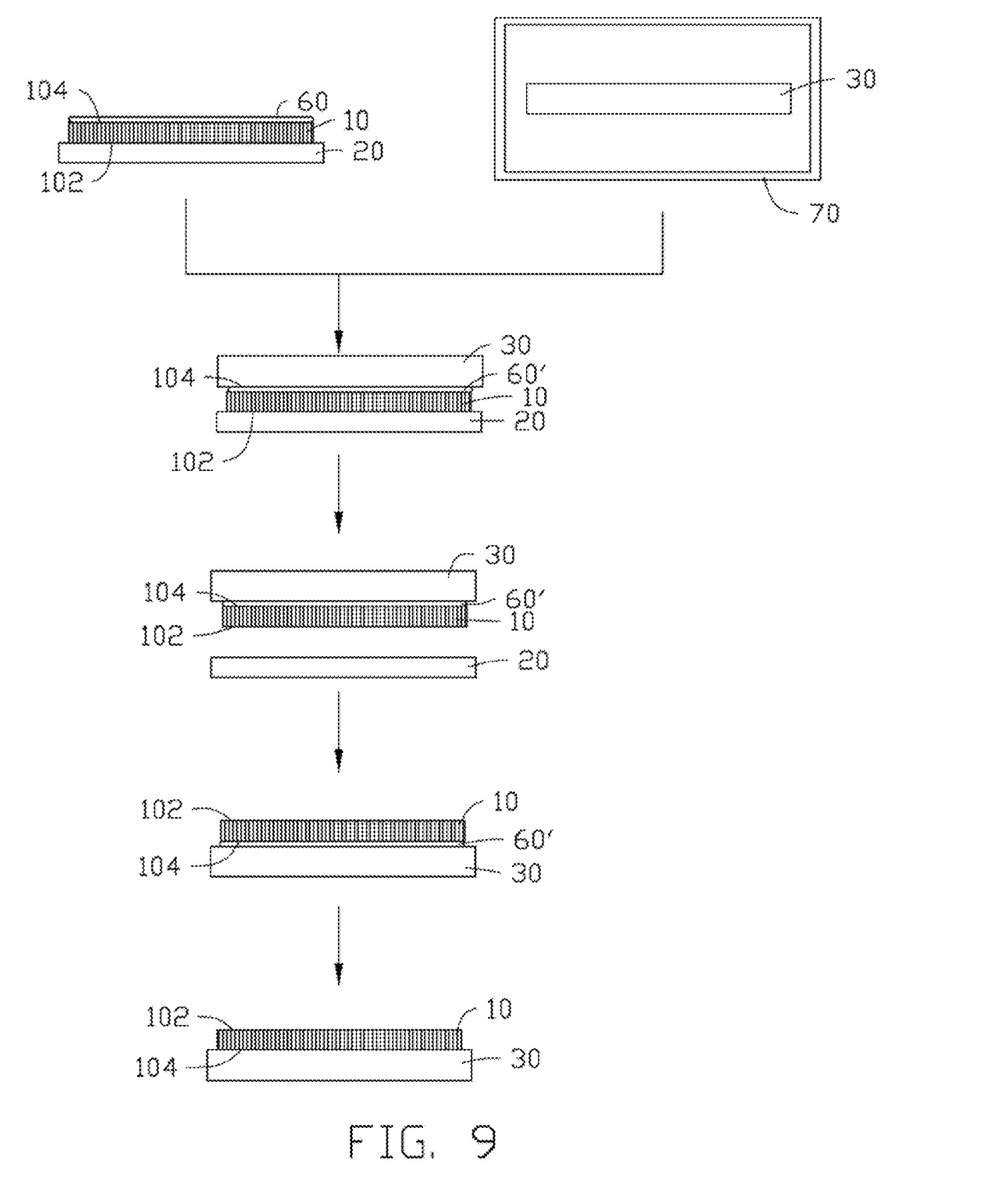
FIG. 9 is a schematic side view of yet another embodiment of the method for transferring the carbon nanotube array.

Referring to FIG. 9, in another embodiment, when the liquid medium 60 is formed on the top surface 104 of the carbon nanotube array 10, a temperature of the substitute substrate 30 can be decreased to below the freezing point before contacting the substitute substrate 30 with the liquid medium 60. For example, the substitute substrate 30 can be kept in the freezer 70 for a period of time until the substitute substrate 30 reaches a temperature below the freezing point. Thus, when the substitute substrate 30 contacts the liquid medium 60 on the top surface 104 of the carbon nanotube array 10, the liquid medium 60 can be directly frozen into solid medium 60'.

During the separating of the substitute substrate 30 from the growing substrate 20, due to the bonding between the carbon nanotube array 10 and the substitute substrate 30 by the solid medium 60', the separating of the two substrates can separate the carbon nanotube array 10 from the growing substrate 20. During the separating, a majority of the carbon nanotubes in the carbon nanotube array 10 can be detached from the growing substrate 20 at the same time by cutting means, or moving either the substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the substitute substrate 30 and the growing substrate 20 separate, the two substrates both moves along the direction perpendicular to the growing surface of the growing substrate 20 and depart from each other.

During the removing of the solid medium 60', the solid medium 60' can be heated and melt into liquid medium, and dried between the substitute substrate 30 and the carbon nanotube array 10. In another embodiment, the heating can directly sublimate the solid medium 60'. The removal of the solid medium 60' does not affect the state of the carbon nanotube array 10. Due to the thickness of the solid medium 60' being small, after the removal of the solid medium 60', the top surface 104 of the carbon nanotube array 10 can be in contact with the surface of the substitute substrate 30 and bonded by van der Waals attractive forces.

For drawing the carbon nanotube film 40, the bonding force between the carbon nanotube array 10 and the substitute substrate 30 should be small. The bonding force is increased by the solid medium 60' to separate the carbon nanotube array 10 from the growing substrate 20 and decreased by removing the solid medium 60' before drawing the carbon nanotube film 40. Thus, the material of the substitute substrate 30 is not limited to PDMS and can be soft, elastic, and rigid solid materials.

Pattering of Carbon Nanotube Array

Figure 10:
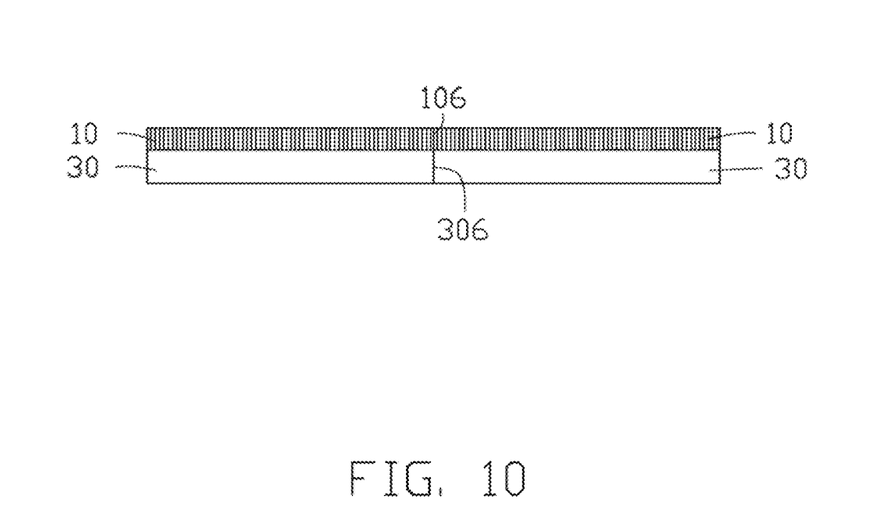
FIG. 10 is a schematic side view of an embodiment of an assembling array.

Referring back to FIG. 1 and FIG. 2 accompanying with FIG. 10, in block S2, the plurality of substitute substrates 30 can be arranged side by side at the same flat surface. The plurality of substitute substrates 30 can have the same shape/size or at least have the same height. Thus, the carbon nanotube arrays 10 located thereon can be at the same horizontal level.

The carbon nanotube array 10 can have a side surface 106 that is substantially perpendicular to the top surface 104 and the bottom surface 102 and connected between the top surface 104 and the bottom surface 102. The substitute substrate 30 can have a side wall 306 that is alignment with the side surface 106 of the carbon nanotube array 10 transferred thereon. The side walls 306 of adjacent substitute substrate 30 can be in contact with each other so that the side surfaces 106 of the carbon nanotube arrays 10 can be also in contact with each other. Due to that the carbon nanotube array 10 has a relatively large specific surface area, a relatively great van der Waals attractive force can be formed between the adjacent and contacted side surfaces 106 of the carbon nanotube arrays 10. This van der Waals attractive force formed between the adjacent and different carbon nanotube arrays 10 can be comparable with the van der Waals attractive force between carbon nanotubes in the same carbon nanotube array 10. Thus, the assembling array 80 that is formed by contacting the side surfaces 106 of the carbon nanotube arrays 10 can be seen as an integrated carbon nanotube array 10. The area of the top surface of the assembling array 80 is equal to the sum area of the top surfaces 104 of the carbon nanotube arrays 10. The assembling array 80 has a size larger than one carbon nanotube array 10 at least along a first direction (x).

In one embodiment, when the surface 302 of the substitute substrate 30 is larger than the top surface 104 of the carbon nanotube array 10 and the side wall 306 of the substitute substrate 30 is not alignment with the side surface 106 of the carbon nanotube array 10, a further step of cutting the transferred structure can be previously processed before the contacting of the substitute substrates 30. The cutting can form a side wall 306 of the substitute substrate 30 that is alignment with the side surface 106 of the carbon nanotube array 10. In some embodiments, the cutting can be laser cutting or mechanical cutting.

In one embodiment as shown in FIG. 2, two round carbon nanotube arrays 10 transferred to two rectangular substitute substrates 30 can be cut into two rectangular carbon nanotube arrays 10' having the side surfaces 106 alignment with the side walls 306 of the rectangular substitute substrates 30.

During the contacting of the side surfaces 106 of the carbon nanotube arrays 10, the larger the contacting area, the closer the two side surfaces 106, the larger the van der Waals attractive force formed between the side surfaces 106. In one embodiment, the substitute substrates 30 are made of an elastic material and can be compressed under a pressing force. During the contacting, the compressing of the elastic substitute substrates 30 can bring the two carbon nanotube arrays 10 more closer to each other thus having a closer contact.

Figure 11:
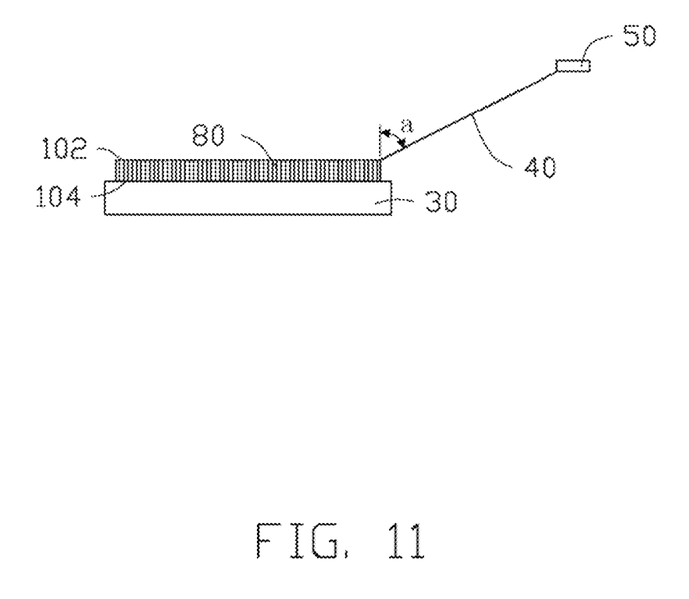
FIG. 11 is a schematic side view of an embodiment of a drawing a carbon nanotube film from the assembling array.

Referring to FIGS. 1, 2 and 11, in block S3, the carbon nanotube film 40 is drawn from the assembling array 80.

Block S3 can comprise:

selecting a carbon nanotube segment having a predetermined width from the assembling array 80 by using a drawing tool 50; and drawing a plurality of carbon nanotube segments joined end to end by van der Waals attractive force by moving the drawing tool 50, thereby forming a continuous carbon nanotube film 40.

The drawing tool 50 can be adhesive tape, pliers, tweezers, or other tool allowing multiple carbon nanotubes to be gripped and pulled simultaneously.

The carbon nanotube segment comprises a single carbon nanotube or a plurality of carbon nanotubes substantially parallel to each other. The drawing tool 50 such as adhesive tape can be used for selecting and drawing the carbon nanotube segment. The adhesive tape may contact with the carbon nanotubes in the assembling array 80 to select the carbon nanotube segment. The drawing tool 50 can select a large width of carbon nanotube segments to form the carbon nanotube film 40

An angle between a drawing direction of the carbon nanotube segments and the growing direction of the carbon nanotubes in the assembling array 80 can be larger than 0 degrees (e.g., 30° to 90°).

In block S3, the carbon nanotube film 40 is drawn from the assembling array 80 that was transferred to the substitute substrates 30, not from the carbon nanotube array 10 located on the growing substrate 20. The carbon nanotube film 40 can be drawn from the assembling array 80 pieced by the carbon nanotube arrays 10 upside down on the surfaces 302 of the substitute substrates 30 (i.e., drawn from the bottom surfaces 102 of the carbon nanotube arrays 10).

Block S3 is different from the separating of the carbon nanotube array 10 as a whole from the growing substrate 20. The carbon nanotube array 10 separated from the growing substrate 20 still in the array shape. The purpose of block S3 is to draw out carbon nanotubes one by one or segment by segment to form a carbon nanotube film 40 from the assembling array 80 on the substitute substrates 30.

The carbon nanotube film 40 can be drawn along any direction from the assembling array 80. The assembling array 80 has the size larger than the single carbon nanotube array 10 along the first direction (x). When drawing the carbon nanotube film 40 along a second direction (y) substantially perpendicular to the first direction (x), the drawn carbon nanotube film 40 can have a larger width than the carbon nanotube film that is drawn from the single carbon nanotube array 10. Due to the assembling array 80 that is pieced by the plurality of carbon nanotube arrays 10 is an integrated structure, the drawn carbon nanotube film 40 is also an integrated film which is different from drawing two separate carbon nanotube films simultaneously from two separate carbon nanotube arrays 10.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for making a carbon nanotube film, the method comprising:
   providing a plurality of carbon nanotube arrays transferred onto a plurality of substitute substrates, the plurality of carbon nanotube arrays having an ability to have the carbon nanotube film drawn therefrom, and the carbon nanotube film comprising a plurality of carbon nanotubes joined end to end;
   placing the plurality of substitute substrates side by side to contact and combine side surfaces of the plurality of carbon nanotube arrays with each other by van der Waals attractive force to form an assembling array, the assembling array is larger than each of the plurality of carbon nanotube arrays;
   drawing a plurality of carbon nanotube segments joined end to end by van der Waals attractive force from the assembling array.

2. The method of claim 1, wherein the plurality of substitute substrates comprises a first substitute substrate, the plurality of carbon nanotube arrays comprises a first carbon nanotube array, the providing the plurality of carbon nanotube arrays transferred onto the plurality of substitute substrates comprises:
   providing a growing substrate having the first carbon nanotube array grown thereon, the first carbon nanotube array having a bottom surface on the growing substrate and a top surface away from the growing substrate, and the first carbon nanotube array having the ability to have the carbon nanotube film drawn therefrom;
   contacting a surface of the first substitute substrate to the top surface of the first carbon nanotube array; and
   separating the first substitute substrate from the growing substrate, thereby separating the bottom surface of the first carbon nanotube array from the growing substrate to transfer the first carbon nanotube array from the growing substrate to the first substitute substrate, the first carbon nanotube array still having the ability to have the carbon nanotube film drawn therefrom.

3. The method of claim 2, wherein the surface of the first substitute substrate and the top surface of the first carbon nanotube array are combined only by van der Waals attractive forces.

4. The method of claim 2, wherein the surface of the first substitute substrate has a plurality of microstructures located thereon.

5. The method of claim 2, wherein the first substitute substrate is spaced from the growing substrate by a spacing element, and the spacing element has a height between the first substitute substrate and the growing substrate less than or equal to the height of the first carbon nanotube array.

6. The method of claim 1, wherein the plurality of substitute substrates comprises a first substitute substrate, the plurality of carbon nanotube arrays comprises a first carbon nanotube array, the providing the plurality of carbon nanotube arrays transferred onto the plurality of substitute substrate comprises:
   providing a growing substrate having the first carbon nanotube array grown thereon, the first carbon nanotube array having a bottom surface on the growing substrate and a top surface away from the growing substrate, and the first carbon nanotube array having the ability to have a carbon nanotube film drawn therefrom;
   placing the first substitute substrate on the top surface of the first carbon nanotube array and sandwiching liquid medium between the first substitute substrate and the first carbon nanotube array;
   solidifying the liquid medium between the first substitute substrate and the first carbon nanotube array into solid medium;
   separating the first substitute substrate from the growing substrate, thereby separating the bottom surface of the first carbon nanotube array from the growing substrate; and
   removing the solid medium between the first substitute substrate and the first carbon nanotube array, wherein the first carbon nanotube array still having the ability to have the carbon nanotube film drawn therefrom.

7. The method of claim 6, wherein the sandwiching the liquid medium between the first substitute substrate and the first carbon nanotube array comprises:
   forming the liquid medium on the top surface of the first carbon nanotube array; and
   contacting a surface of the first substitute substrate and the liquid medium on the top surface with each other.

8. The method of claim 7, wherein the solidifying the liquid medium between the first substitute substrate and the first carbon nanotube array comprises contacting the first substitute substrate having a temperature below a freezing point with the liquid medium on the top surface of the first carbon nanotube array.

9. The method of claim 6, wherein the sandwiching the liquid medium between the first substitute substrate and the first carbon nanotube array comprises:
   forming the liquid medium on a surface of the first substitute substrate; and
   contacting the top surface of the first carbon nanotube array and the liquid medium on the surface of the first substitute substrate with each other.

10. The method of claim 6, wherein the solidifying the liquid medium between the first substitute substrate and the first carbon nanotube array comprises placing a laminate of the growing substrate, the first carbon nanotube array, the liquid medium, and the first substitute substrate into an environment having a temperature below a freezing point of the liquid medium.

11. The method of claim 6, wherein the liquid medium comprises water.

12. The method of claim 1, wherein the plurality of substitute substrates have side walls being alignment with the side surfaces of the plurality of carbon nanotube arrays transferred thereon.

13. The method of claim 1, wherein the assembling array has a size larger than one of the plurality of carbon nanotube arrays along a first direction, and the plurality of carbon nanotube segments are drawn along a second direction substantially perpendicular to the first direction.

14. The method of claim 1, wherein the plurality of substitute substrates are elastic.

15. A method for making a carbon nanotube film, the method comprising:

providing a plurality carbon nanotube arrays transferred onto a plurality of second substrates from a plurality of first substrates, the plurality of carbon nanotube arrays having an ability to have the carbon nanotube film drawn therefrom, and the carbon nanotube film comprising a plurality of carbon nanotubes joined end to end;

placing the plurality of second substrates side by side to contact and combined side surfaces of the plurality of carbon nanotube arrays with each other by van der Waals attractive force to form an assembling array, the assembling array is larger than each of the plurality of carbon nanotube arrays;

drawing a plurality of carbon nanotube segments joined end to end by van der Waals attractive force from the assembling array.

* * * * *